Figure 1:
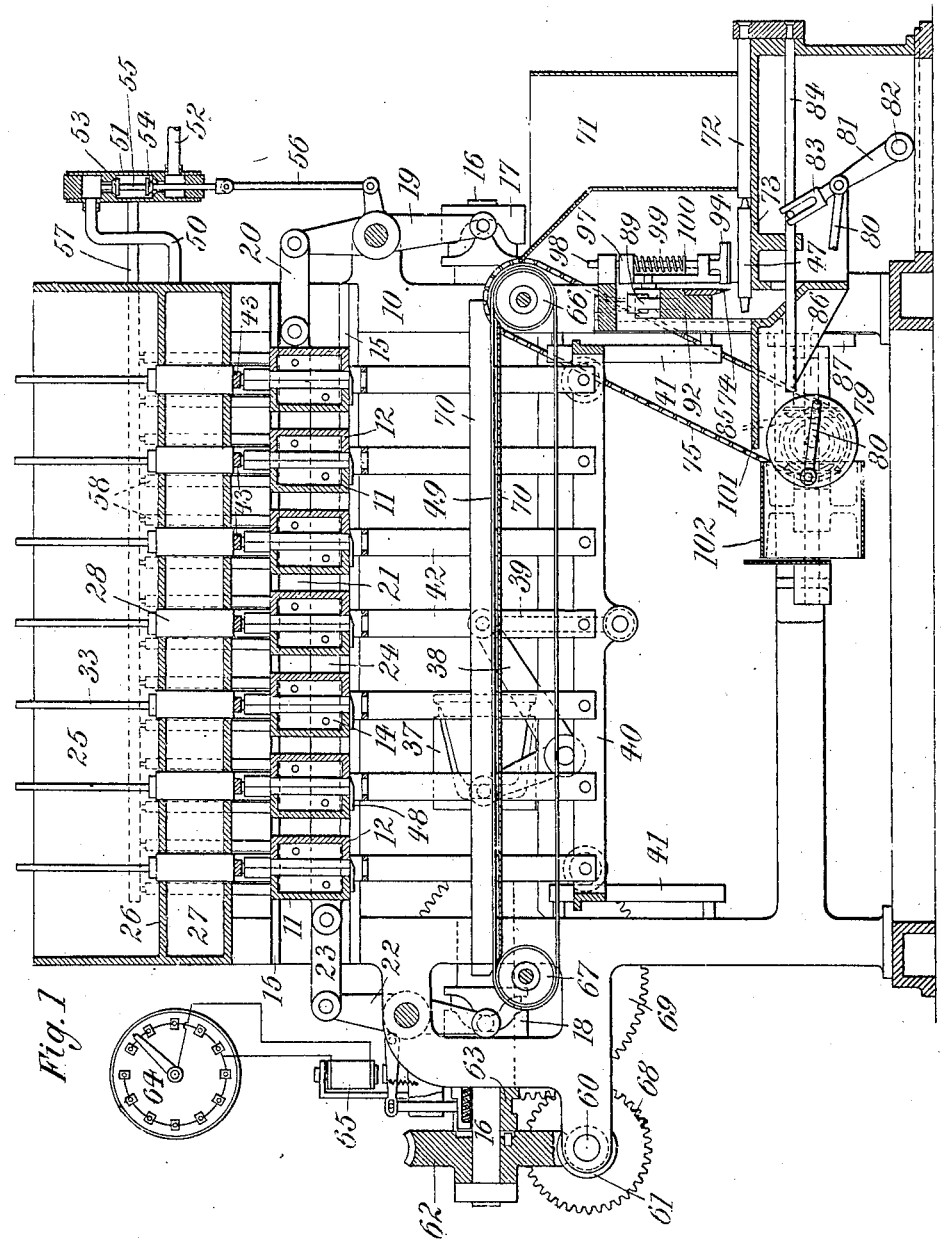

No. 873,073. PATENTED DEC. 10, 1907.
C. NORDFORS.
MACHINE FOR MOLDING CANDLES.
APPLICATION FILED MAY 2, 1907.

3 SHEETS—SHEET 1.

Witnesses:
Arthur E. Jumpe
Adolph Miner

Inventor
Conrad Nordfors
By his Attorney
Frank O. Friesen

No. 873,073. PATENTED DEC. 10, 1907.
C. NORDFORS.
MACHINE FOR MOLDING CANDLES.
APPLICATION FILED MAY 2, 1907.
3 SHEETS—SHEET 2.
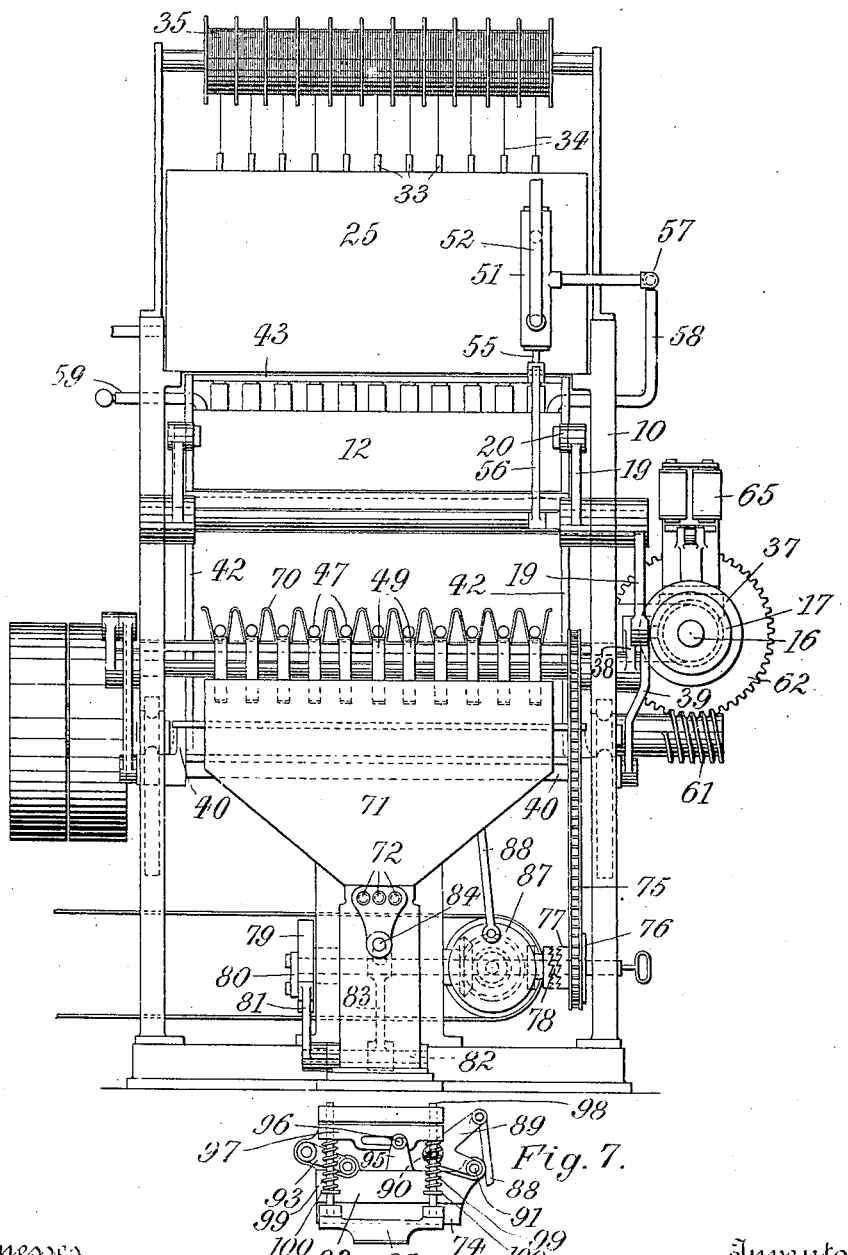

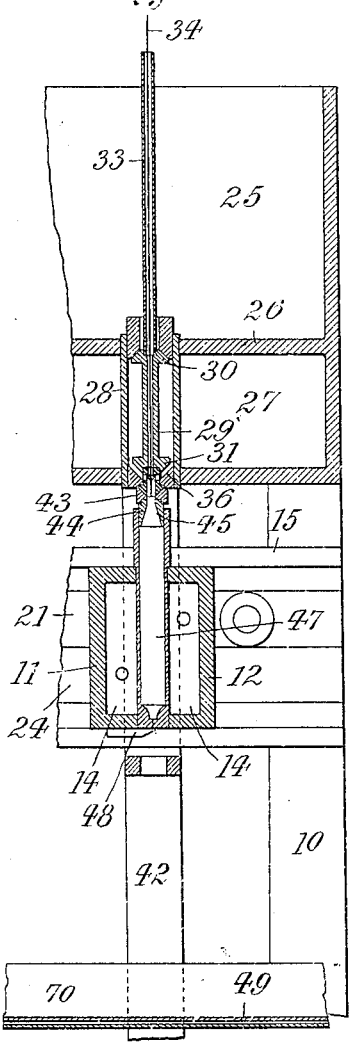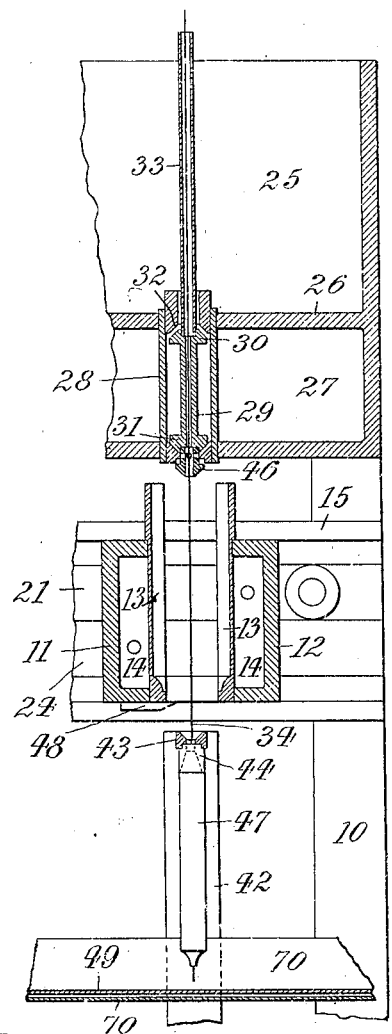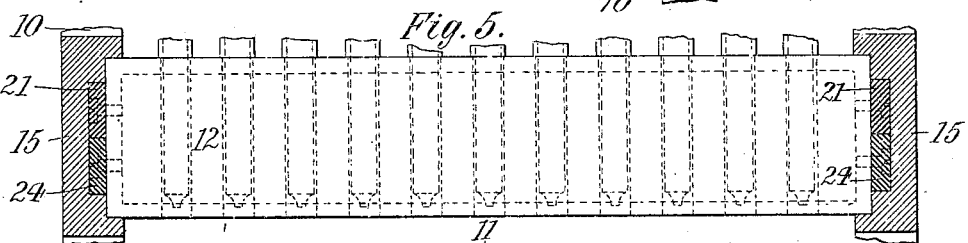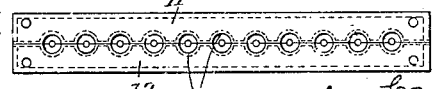

UNITED STATES PATENT OFFICE.

CONRAD NORDFORS, OF JERSEY CITY, NEW JERSEY.

MACHINE FOR MOLDING CANDLES.

No. 873,073.

Specification of Letters Patent.

Patented Dec. 10, 1907.

Application filed May 2, 1907. Serial No. 371,424.

*To all whom it may concern:*

Be it known that I, CONRAD NORDFORS, a citizen of the United States, residing at Jersey City, Hudson county, State of New Jersey, have invented new and useful Improvements in Machines for Molding Candles, of which the following is a specification.

This invention relates to a machine for casting candles by means of a suitable number of divided molds, each composed of a pair of movable sections. When the mold is closed, it is automatically charged with a measured quantity of the candle material, which is chilled within the mold so as to set rapidly. The mold is then opened by causing its two sections to recede simultaneously in opposite directions, whereby a central clearance for the unobstructed discharge of the candle is established. This discharge is effected by a perforated ejector which embraces the wick and pushes the candle down through the mold, at the same time reeling off a length of wick sufficient for the next candle. This wick is cut off above the molded candle, so that the latter will drop upon a conveyer that carries it to a hopper. Plungers traversing the hopper deliver the candles to a knife that trims the butt, thus completing the operation. All the parts operate automatically, and means are provided for lengthening and shortening the periods during which the candles set within the molds, so that the machine may be readily adapted to work upon different materials and turn out candles of various dimensions.

In the accompanying drawings: Figure 1 is a vertical longitudinal section, partly in elevation, of my improved machine for molding candles; Fig. 2 a right hand end elevation thereof, with some of the parts omitted; Fig. 3 a detail vertical section through one of the molds and pockets; Fig. 4 a similar section showing the parts in a different position; Fig. 5 a side view of one of the mold-blocks; Fig. 6 a plan of a pair of co-acting mold-blocks, on a reduced scale, and Fig. 7 a detail of the butt trimmer.

The frame 10 of the machine supports a suitable number of candle molds or mold-blocks, each of which is composed of two movable sections 11 and 12. Of these, all sections 11 are movable laterally in one direction, while sections 12 are simultaneously movable in the opposite direction, so that the mold is opened when its sections recede from each other, and is closed when such sections approach each other. The advantage of making the mold in two movable sections, is, that the cast candle will be freed from both halves of the mold when the latter is opened, and may thus be discharged along the axis of the mold without contacting with either of the mold-sections.

The mold-sections 11, 12, are hollow and provided with a series of vertical casting recesses 13, each corresponding in size to one-half of the candle, the recesses of one section being alined with those of the other section. The hollow body of each mold-section forms a jacket 14 for the consecutive admission of a heating and a chilling medium. During their movement, the mold-sections are guided by flanged rails 15 of frame 10, (Fig. 5), and are reciprocated in the following manner: A rotating shaft 16 carries at one end a cam 17, and on the other end a cam 18. Cam 17 is operatively engaged by a lever 19 which, in turn, by a link 20, is connected to a draw-bar 21 to which all the right hand mold-sections 12 are attached. In like manner cam 18 is engaged by a lever 22 connected by link 23 to a draw-bar 24 to which all the left hand mold sections 11 are attached. Cams 17 and 18 are substantial duplicates of each other, so that each complete rotation of shaft 16 will cause an alternate outward and inward movement of bars 21, 24, whereby the desired successive opening and closing of all the molds connected to said bars is effected.

The candle material is contained in an upper tank 25 provided below its bottom 26 with a heating chamber 27, adapted for the reception of steam or other heating medium. In axial alinement with each mold there extends through chamber 27 a tubular measuring pocket 28 of a size to accommodate the material necessary for casting a single candle. Within pocket 28 is free to play the common tubular stem 29 of a pair of perforated valves 30, 31, mounted on opposite ends thereof, the length of the stem being such that when one of the valves is closed, the other valve is open. Upper valve 30 has a conical seat 32 which is perforated to establish communication between tank 25 and pocket 28. To this upper valve 30 is attached a wick tube 33 projecting through tank 25 and inclosing wick 34, received from reel 35. Lower valve 31 has a tapering seat 36, and when lifted, permits the escape of the liquid charge of pocket 28 into the mold.

The means for operating valves 30, 31, and which also serve to eject the set candles from the molds, in manner hereinafter described, are as follows: Fast on shaft 16 is a cam 37 which, by lever 38 and link 39, reciprocates a vertically movable frame 40 guided along rails 41. From each side of frame 40 extend upwards a series of supports 42 connected at their upper ends by a series of parallel transverse bars 43, one of said bars being arranged below each transverse line of pockets 28. Bars 43 are provided centrally above each mold with a depending plunger 44 having a socketed bottom 45, and an upright perforation adapted to embrace wick 34. The upper side of rod 43 constitutes a valve lifter adapted to actuate stem 29 by engagement with a perforated nipple 46 depending from the latter. When frame 40 is raised, bar 43 will open valve 31 and close valve 30, while plunger 44 will form the top of the mold, which simultaneously closes against the same, (Fig. 3). When frame 40 is lowered, valve 31 will close and valve 30 will open by gravity, while plunger 44 will carry the set candle axially downward through the mold which is now open, and reel off a length of wick sufficient for the next candle, (Fig. 4). In this way plunger 44 constitutes an ejector for discharging the set candle from the mold along the central line thereof and in such a way, that the candle clears both mold-sections. After the candle has thus been lowered beneath the mold, frame 40 is again raised into the position shown in Fig. 3, while candle 47 will remain suspended from wick 34. Each mold-section 11 carries at its bottom a cutter 48, which, upon the closing of the mold will sever the wick above the candle and cause the latter to drop upon a conveyer 49, of a construction hereinbelow described.

Means are provided for automatically admitting a heating medium into the jackets 14 of mold-sections 11, 12, when the latter are opened, and for admitting a cooling medium thereto when the molds are closed. In this way the molds are preheated to insure an even flow of material and a smooth surface of the cast, while the subsequent chilling serves to accelerate the setting of the candle.

The heating medium such as hot water or steam may be drawn from chamber 27 and flows through pipe 50 into the upper end of a valve casing 51, the lower end of which receives a suitable cooling medium from pipe 52. Within casing 51 plays the common stem 55 of a pair of valves 53, 54, mounted on opposite ends thereof, and of such a length that when one valve is closed, the other valve is open. Stem 55 receives intermittent reciprocating movement from lever 19 by link 56, said lever also controlling the movement of the molds, as hereinabove described. The central chamber of casing 51 connects with a pipe 57, which, by a series of flexible tubes 58 communicates with jackets 14 of mold-sections 11, 12. The spent heating or cooling medium is discharged from the latter through a suitable outlet 59. During the opening of the molds, lever 19 will, by link 56, draw stem 55 down to open valve 53 and thereby cause the heating medium to flow into the molds. During the closing of the latter, valve 53 will be closed and valve 54 will be opened, so that the cooling medium will flow into the molds where it acts upon the cast until the molds are again opened.

Means are provided for imparting to shaft 16 intermittent rotary motion and for adjusting the intervals of rest between the periods of motion. This adjustment has for its object to control the time during which the molds remain closed and during which the cast is exposed to the action of the chilling medium. Thus, the machine may be adapted to operate upon different materials and to mold candles of various dimensions.

As shown, power-shaft 60 has a worm 61 engaging worm-wheel 62, which, by clutch 63, is adapted to be intermittently coupled to shaft 16. The movement of clutch 63 is such that shaft 16 is arrested for a predetermined time upon each complete rotation. The length of this time may be adjusted by a suitable electric controller 64, that may have a clock-work adapted to close an electric circuit at predetermined intervals. Controller 64 is in circuit with an electromagnet 65 which is operatively connected to the clutch in suitable manner.

Conveyer 49 consists of a series of spaced parallel endless bands engaging rollers 66, 67, of which roller 67 is driven from shaft 60 by wheels 68, 69. The upper runs of bands 49 are accommodated by grooves formed between the upwardly projecting ridges of a corrugated guide 70. Thus, as the candles drop upon bands 49, they will be properly positioned by guide 70 and carried in parallel lines towards a hopper 71, within which the candles accumulate. Directly above its bottom, hopper 71 is traversed by a suitable number of plungers 72 adapted to push the bottom candles out of the hopper and upon a table 73, where their butt ends are trimmed by a knife 74. To admit the plungers and permit the candles to be discharged from the hopper, the latter is provided with alined front and rear openings, as will be readily understood.

The means for reciprocating plunger 72 and for operating knife 74, are as follows: Wheel 66, by a chain 75, drives a wheel 76, which, by coupling 77, is adapted to engage shaft 78. Upon the latter is mounted a crank-disk 79, which, by rod 80, lever 81, rock-shaft 82 and forked lever 83, reciprocates a slide 84 to which plungers 72 are attached. The object of the coupling 77 is to provide means for delaying the action of the plungers until a suitable number of candles have accumulated in hopper 71. Shaft 78 is intergeared by wheels 85 with shaft 86 carrying crank-disk 87. The latter is by rod 88 connected to a bell-crank 89 turning on fulcrum 90. Bell-crank 89 is at 91 pivoted to one end of the cutter-head 92 of knife 74, the other end of said head being connected to a fixed support by a link 93.

It will be seen that by the rotation of crank-disk 87, a shearing action will be imparted to knife 74, so that a clean cut is insured. During the cutting operation, the candles are held to table 73 by a padded presser-foot 94 which is caused to descend upon the candles while head 92 swings downward. To operate presser-foot 94, head 92 has a projection 95, which, by pin 96, engages a slotted slide 97. This slide moves along rods 98 to which presser-foot 94 is attached. Rods 98 are surrounded by coiled springs 99 bearing with their upper ends against slide 97, while their lower ends engage collars 100 fast on rods 98. Upon the descent of head 92, slide 97 will be lowered to yieldingly lower presser-foot 94 by springs 99, while, when head 92 ascends, it will carry slide 97 and presser-foot 94 with it.

From table 73, the trimmed candles are pushed by the succeeding candles upon a table 101 from which they are pushed in like manner upon a conveyer 102. The latter receives motion from shaft 78 in suitable manner and delivers the finished candles to the place desired.

The operation of the machine will be understood from the foregoing description. The candles are discharged from the molds by the ejectors in such a manner that they will clear both halves of the mold-sections, the latter receding simultaneously in opposite directions to permit an unobstructed descent of the candles. In this way a perfect product is insured, all scratching or other injury by abrasion or contact with the mold being prevented. The machine further insures an automatic charging of the molds with a measured quantity of the candle material, an automatic alternate heating and cooling of the mold-sections, and a positive discharge of the molded candle. So also the length of the chilling periods may be regulated and will be automatically maintained after being regulated. Finally, the cast candles are trimmed automatically, and in such a way that they will leave the machine in a finished and perfect condition.

I claim:

1. In a machine of the character described, a divided mold, means for automatically opening and closing said mold, and means for placing a wick into the mold, substantially as specified.

2. In a machine of the character described, a divided mold, means for simultaneously moving the mold-sections in opposite directions, and means for placing a wick into the mold, substantially as specified.

3. In a machine of the character described, a divided mold, means for automatically sliding the mold sections in opposite directions, and a cutter attached to one of said mold-sections substantially as specified.

4. In a machine of the character described, a pair of hollow blocks having a series of alined casting recesses, means for placing wicks into said recesses and means for sliding said blocks alternately in opposite directions substantially as specified.

5. In a machine of the character described, a series of divided molds, means for placing wicks into said molds, a pair of rods connected to alternate mold-sections, and means for simultaneously reciprocating said rods in opposite directions, substantially as specified.

6. In a machine of the character described, a divided hollow mold, means for opening and closing said mold, valves for alternately conveying a heating and cooling medium to the mold, and valve-actuating means controlled by the mold-opening and closing means, substantially as specified.

7. In a machine of the character described, a mold, a pocket above the same, automatic means for establishing communication between said pocket and said mold and means for drawing a wick through the pocket and mold, substantially as specified.

8. In a machine of the character described, a tank, a pocket, a mold, means for establishing communication between the tank and pocket, means for establishing communication between the pocket and mold and means for drawing a wick through the pocket and mold, substantially as specified.

9. In a machine of the character described, a tank, a pocket, a mold, means for establishing communication between the tank and pocket, means for establishing communication between the pocket and mold, means for opening the first-named means upon the closing of the second-named means and means for drawing a wick through the pocket and mold, substantially as specified.

10. In a machine of the character described, a tank, a pocket, a mold below the pocket, an upper and a lower opening in the pocket, a stem within the pocket, and an upper and a lower valve carried by the stem, substantially as specified.

11. In a machine of the character described, a tank, a heating chamber below the tank, a valve-controlled pocket embraced by the heating chamber and communicating with the tank, a mold below the pocket and means for drawing a wick through the pocket and mold, substantially as specified.

12. In a machine of the character described, a tank, a heating chamber below the tank, a pocket embraced by the heating chamber, a mold below the pocket, means for establishing communication between the tank and the pocket, means for establishing communication between the pocket and the mold and means for drawing a wick through the pocket and mold, substantially as specified.

13. In a machine of the character described, a tank, a divided mold, means for opening and closing the mold, automatic means for establishing communication between the tank and the mold when the mold is closed and means for placing a wick into the mold, substantially as specified.

14. In a machine of the character described, a tank, a mold beneath the tank, a perforated valve controlling communication between tank and mold, and a wick embraced by said valve, substantially as specified.

15. In a machine of the character described, a tank, a mold beneath the tank, a perforated valve controlling communication between tank and mold, and a wick tube projecting upwardly from said valve, substantially as specified.

16. In a machine of the character described, a tank having an outlet, a valve controlling said outlet, a mold beneath the outlet, a valve-lifter, and an ejector depending from the lifter and adapted to engage the mold, substantially as specified.

17. In a machine of the character described, a tank having an outlet, a valve controlling said outlet, a mold beneath the outlet, a valve-lifter, and a perforated and socketed ejector depending from the lifter and adapted to engage the mold, substantially as specified.

18. In a machine of the character described, a divided mold, means for opening and closing the mold, means for placing a wick therein, a perforated ejector surrounding the wick, and means for lowering said ejector when the mold is open, substantially as specified.

19. In a machine of the character described, a mold, a charging valve above the same, a vertically movable bar adapted to engage the valve, and an ejector depending from the bar and adapted to engage the mold, substantially as specified.

20. In a machine of the character described, a divided mold, means for imparting intermittent movement to the mold-sections in opposite directions, and means for adjusting the periods of rest intervening between the periods of motion, substantially as specified.

21. In a machine of the character described, a series of molds, a series of endless conveyer bands beneath the molds, and a corrugated guide having grooves within which the bands are movable, substantially as specified.

22. In a machine of the character described, a mold, a hopper, means for conveying candles from the mold to the hopper, and a plunger movable over the bottom of the hopper, substantially as specified.

23. In a machine of the character described, a mold, a hopper, means for conveying candles from the mold to the hopper, a plunger traversing the hopper, and a cutter alined with the plunger, substantially as specified.

24. In a machine of the character described, a mold, a hopper, means for conveying candles from the mold to the hopper, a plunger traversing the hopper, a cutter alined with the plunger, and a presser-foot operatively connected to the cutter, substantially as specified.

25. In a machine of the character described, a tank, a divided mold, means for establishing communication between the tank and mold, means for moving the mold-sections alternately in opposite directions, and an ejector movable within the mold, substantially as specified.

Signed by me at New York city, (Manhattan,) N. Y., this 1st day of May, 1907.

CONRAD NORDFORS.

Witnesses:
WILLIAM SCHULZ,
FRANK V. BRIESEN.